United States Patent [19]

Schmidlin

[11] 4,206,248
[45] Jun. 3, 1980

[54] PROCESS FOR DEPOSITING A SELECTED COATING HAVING DUAL LAYERS

[75] Inventor: Hans Schmidlin, Aesch, Switzerland

[73] Assignee: Eltreva AG, Aesch, Switzerland

[21] Appl. No.: 882,566

[22] Filed: Mar. 2, 1978

[30] Foreign Application Priority Data

Mar. 3, 1977 [DE] Fed. Rep. of Germany ....... 2709239

[51] Int. Cl.² .............................................. B05D 1/00
[52] U.S. Cl. ..................................... 427/27; 126/417;
126/901; 165/49; 165/133; 165/146; 427/74;
427/158; 427/163; 427/192; 427/195; 427/241;
427/318; 427/160; 427/386; 427/409; 427/425;
428/416; 428/458; 428/913; 427/388.1
[58] Field of Search ................... 427/27, 78, 157, 158,
427/163, 203, 202, 205, 214, 241, 160, 385 R,
385 B, 388 R, 74, 195, 318, 386, 409, 425, 192;
428/458, 913, 917, 480, 416; 126/270, 271;
204/181 R; 165/49, 133, 146

[56] References Cited

U.S. PATENT DOCUMENTS

| 3,308,004 | 3/1967 | Rouault | 427/160 X |
| 3,513,012 | 5/1970 | Point | 427/27 |
| 3,810,777 | 5/1974 | Boebel et al. | 427/160 |
| 3,920,413 | 11/1975 | Lowery | 126/270 X |
| 3,998,716 | 12/1976 | Masar et al. | 427/27 X |
| 4,015,582 | 4/1977 | Liu et al. | 126/270 |
| 4,048,980 | 9/1977 | Googin et al. | 126/270 |
| 4,090,496 | 5/1978 | Mallet | 126/271 |
| 4,101,691 | 7/1978 | Borchet | 165/133 X |
| 4,104,102 | 8/1978 | Eagon et al. | 427/27 X |
| 4,122,211 | 10/1978 | Kikuga et al. | 427/27 |

Primary Examiner—Ronald H. Smith
Assistant Examiner—Thurman K. Page
Attorney, Agent, or Firm—Michael J. Striker

[57] ABSTRACT

A process is disclosed for the production of a sun heat energy absorbing coating on a metallic substrate. The metallic substrate is pretreated for subsequent coating with a film of powder varnish and thereafter a coating based on a solid synthetic resin is deposited electrostatically or in a whirl sintering procedure. The coating consists of an inner brightening layer containing a metallic powder and an outer colored second layer absorbing the sun energy.

12 Claims, 1 Drawing Figure

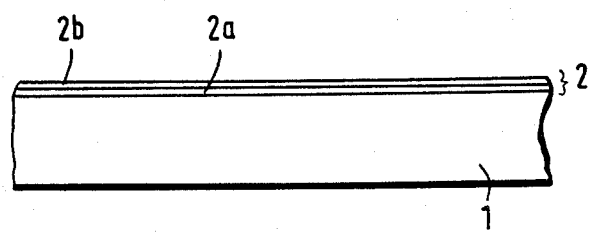

PROCESS FOR DEPOSITING A SELECTED COATING HAVING DUAL LAYERS

The invention relates to a process of depositing a selected coating for absorbing sun heat energy upon a metallic substrate, the surface of which is subjected to a preliminary preparative treatment and is then provided with a coating including a lower brightening first layer and an upper second layer absorptive of the sun energy.

A process of this type has been made public in the German Published Patent Application (DT-OS) No. 24 38 329. Therein, a chemical and electrolytical process is disclosed, in which a metallic substrate, for instance, one formed from aluminum, is first eloxidized and is then overplated in a bath with a glossy nickel, depositing a brightening first layer. Over this lower layer, there is then deposited in another bath nickel black for forming a second layer to absorb the sun energy. Instead of this eloxy-anodic treatment, the metallic surface may alternatively be prepared for accepting the brightening first layer by depositing a zinc layer in an immersion procedure.

In thus-prepared sun heat energy absorbing metallic bodies, it is endeavored to obtain a high relation $\alpha/\epsilon$, where $\alpha$ is the absorption capacity and $\epsilon$ the emissive capacity. In order to achieve a high degree of effectiveness, namely high $\alpha/\epsilon$ value should be made, the second layer absorbing the sun energy as thin as possible. In the above known process the thickness of this second layer is in the range of less than 1 micron. For the $\alpha/\epsilon$ values of up to 18 are obtained.

A considerable shortcoming of this known process resides in the technologically demanding and correspondingly costly production of the coating. The costs are increased by the need to select and use special qualities of aluminum for preparation of the aluminum substrates to be coated.

In the known process, the metallic surface must be prepared for application the brightening first layer, for instance by depositing in an immersion procedure a zinc layer. The zinc layers grow grayish in effect of the development of corrosion products, resulting in a lessening of the reflective capacity. Moreover, that the coatings obtained in the above process can not be well repaired.

It is therefore the object of this invention to improve the above method to such a degree that an economically viable effectiveness is achieved with avoidance of the above mentioned disadvantages.

In starting from the above process, this object is achieved according to this invention in a surprisingly simple manner, with namely, by depositing as the coating a powdered varnish a strong synthetic resin base, which is applied either electrostatically or in a whirl sintering procedure.

It is advantageous to add aluminum powder to the powdered varnish forming the brightening layer.

For the layer absorbing the sun energy, use can be made of a powdered varnish that is transparently colored either before or after its deposition onto the brightening layer.

In a modified process, use can be made for the coating of a phase dividing powdered varnish, wherein the phase formative of the first layer contains aluminum powder. Here, the phase formative of the second layer is colorless or also may have been colored before the deposition of the coating.

In order to improve the heat transfer, it is advantageous to have the powdered varnish contain in addition to the aluminum powder another metallic pigment, preferably a zinc powder.

The metallic substrate may be produced from aluminum. The novel coating however also may be deposited upon other metallic substrates, such as those made of copper, steel, zinc sheet, aluminum etc. Depending upon the choice of substrate and of powder varnish, a pretreatment of the substrate surface to insure proper adhesion of the powder varnish may be effected as known in the art.

In the following, the process according to this invention will be clarified by several examples:

EXAMPLE 1

85 weight parts of a coarsely ground very stiff epoxide resin, based on diphenylolpropane and epichlorhydrin and having the softening point according to DURRANS of between 93° and 104° C., an epoxide equivalent weight of between 875 and 1000, the viscosity of between 430 and 630 cP in a 40% solution (measured in ethyl-glycol-dibutyl-ether at 250° C.), 5 weight parts of a current means concentrate, consisting in the above named epoxide resin and a polyacrylate in a weight relation of 9:1, 4.8 weight parts of finely pulverulent diacyandiamide, 15 weight parts of titanium dioxide and 10 weight parts of barium sulfate, are mixed within a closed quickly revolving mixer first during 1 minute at the 800 rpm and then during 30 minutes at 1600 rpm. The thus obtained mixture is plasticized and homogenized in a BUSS-KO-kneader PR 46 (producer: BUSS AG, Basel) under the following conditions: worm temperature 135° C., casing starting temperature 140° C., nozzle temperature 140° C., the temperature of the molten homogenized mixture 140° C., dosing worm rotation 17.5 rpm, kneader worm rotation 48 rpm, load on the dosing worm 1.1 A, load on the kneader worm 2.6 A, nozzle heating load 1.25 A, nozzle heating setting 7 to 8.

The molten homogenized mixture conveyed away on a cooling band is ground in the per-se known manner, for instance on a hammer mill, to a coarse constitution (maximum granule size of between 4 and 5 mm). Thereafter, a fine grinding is carried out either with simultaneous classificiation or with a following sieving. The maximum granule size of the pulverized varnish amounts to about 120 microns.

There are admixed to this powdered varnish about 2 to 10% of aluminum powder (Leafing value 80%, water distribution-according to the German standard DIN 55 923, 20 000 cm$^2$/g). Now the pulverulent varnish is elaborated in a device appropriate for electrostatic powder spraying operation at a negative high voltage of about 60 kv to form a highly reflective coating which is heated to glow at 160° to 240° C. for 10 to 30 minutes.

Instead of the powder spray procedure, the powdered varnish also can be used to form coatings by other electrostatic deposition methods or by way of whirl sintering.

For forming the sun energy absorbing layer, a colorless powdered varnish is utilized which is produced in the above described way, but without admixture of titanium oxide, barium sulfate and aluminum powder. This powdered varnish is then applied onto the brightening layer in the way that has been described.

EXAMPLE 2

For the sake of endowing the second layer with a higher weather resistance, the powdered varnish utilized for constituting this layer can be a composition based on polyester resins.

In a mixer, there are mixed together 95 weight parts of a polyester resin based on 41% of terepthalic acid, 33% of trimellitic acid anhydrate, 16% of trimethylolpropane and 10% of propanediol, with 5 weight parts of an acrylate current means. The mixture thus obtained is then fed to an extruder with 48 rpm and casing temperature of 140° C., wherein it is plasticized and homogenized. The comminution and deposition of this colorless powdered varnish are performed as in Example 1.

The coating deposited in layer thickness of between 30 and 100 microns is then heat treated for 10 to 30 minutes at the temperature of between 180° and 240° C.

This colorless coating can be additionally dyed to a depth corresponding to the thickness of the colorless powdered varnish film. Any dyeing of the brightening layer forming powdered varnish coating is limited by the fact that aluminum contained in this layer forms a closed film.

EXAMPLE 3

The kind of the dyes to be utilized for dyeing the layer absorbing the sun energy depends on the chemical composition of the colorless powdered varnish. As a rule, they are well equalized, light fast suspension dyeing substances. These dyes are insoluble in water and may be selected from, among others, the azo-dyes and aminoanthraquinone dyes.

The respective 5 to 0.5% suspension of the dye further comprises wetting and/or suspending agents. These wetting and suspending agents can be anionic, cationic or non-ionic, but preferably they should be anionic. Anionic wetting means are for instance carboxylates, sulfonates and sulfates, in particular in the form of sodium salts.

Furthermore, a small amount of a higher alkanol, such as for instance octanol, may advantageously be added to the aqueous medium, usually 1 to 20 drops for each 100 ml water.

Into the medium of this nature, the layered metallic substrates are dipped at temperatures of between 20° C. and 100° C., preferably for 5 to 15 minutes. For obtaining a uniform coloring, it is recommended that the dipping bath be kept in a continuous motion.

EXAMPLE 3a

The dyeing bath needed for the coloring comprises
98% of water
1.5% of a wetting agent
0.4% of benzyl-alcohol
0.1% of the dyeing substance.

The components encompassing alcohol, the solvent and the dyes can be set apart in a simple manner by action of active coal. The dyeing bath composition may be used repeatedly.

EXAMPLE 3b

Composition of the dipping bath medium:
1 weight part of brown celliton BT (BASF-producer)
0.1 weight part of uniperol EL (BASF) pH 5 (acetic acid)
5 weight parts of benzyl-alcohol
0.1 weight part of Basopal OP (BASF)
93.8 weight parts of water

EXAMPLE 4

This novel process for producing a selected sun heat energy absorbing coating can be further simplified by utilization of a phase separating powdered varnish. This is accomplished by the use of powder mixtures that, during the film formation, separate into phases sufficiently speedily and entirely. The melting ranges of both the components contained in the powdered varnish must not strongly differ. In addition, the melting viscosities should be as low as possible.

An epoxide resin (melting point 120° to 130° C., density at 20°/4° C.—1.147, epoxide value 0.049 to 0.059, hydroxyl value 0.36, ester value 0.52) is intimately mixed with an acrylic resin based on butyl methacrylate (melting point 133.4° C., density at 20°/4° C. 1.08) in a 1:1 rates with addition of 4.5 weight percent based on the epoxide resin of dicyandiamide as a hardener, and the resulting product is ground to about 100 microns. The film formation occurs within 20 minutes at the temperature of 180° C.

The IR testing of the composition of the layer shows that the layer half facing the base consists practically of a pure epoxide resin, while the upper half is formed by a nearly pure acrylic resin.

When the first layer contains aluminum powder, as indicated in the Example 1, and when there is achieved a quick wetting preventing aluminum of the lower layer from wandering into the top layer, it is unnecessary to apply a further second colorless layer of powdered varnish.

The coloring of the top layer is effected with the composition and under the conditions set forth in the Example 1.

EXAMPLE 5

A suspension of micro-spheres of poly-ethyl-methacrylate which spheres have the diameter of between 5 and 20 microns is produced in the way of addition of a mixture of 58.2 g of ethyl-methacrylate, 0.4 g of benzoyl-peroxide and 10 drops of N,N-dimethylaniline to a mixture formed from 250 ml of water, 3 g of acrysol A-5 and 1.0 ml of a 3% aerosol OT with vigorous stirring under nitrogen, until there is obtained a good dispersion. This dispersion is left to rest through the night at 250° C. Thereafter by action of an injecting syringe there is injected into the well stirred and lightly colored suspension a solution of 5 g of deep black BB of BASF in 69 ml of tetrahydrofuran (THF).

After the mixture is stirred slowly for about 20 hours, the same is diluted by a multiple of its volume of water and is then slightly stirred and thereafter filtered. The dark filtrate is set aside and the black polymerisate is washed a number of times in a mixer under a speedy stirring. The dry isolated product has a weight of 53 g and is composed mainly of imperspicuous black little spheres of the dimension of between 5 and 20 microns.

The composition of the powdered varnish is now such that the powdered varnish mixture contains as its phase I the dyed acrylate particles and as its phase 2 the epoxide resin powder alluded to in the Example 4, including the aluminum powder. By a single layer deposition, there is obtained a brightening bottom portion with a brownish black transparent layer positioned thereover, which coating looks in cross-section as a whole.

EXAMPLE 6

The powder varnish according to the Examples 1 and 2 may contain in its aluminum containing phase for improving the heat transfer an additional metallic pigment, such as e.g. zinc. The recipe for the powder varnish as expounded in the Examples remains basically unchanged; only the pigmenting is varied in that, instead of titanium oxide and barium sulfate there is now present zinc powder in the amount of about 10 to 90 weight %, preferably 75 weight %.

EXAMPLE 7

An appropriate double-phase pulverulent varnish having an improved heat transmission property can have the following composition:

Phase I:

15.1 weight parts of oxyester P 1137 (being a polyester produced by the company VEBA), 7.6 weight parts of the adduct B 1065 (being isophorone-di-iso-cyanade adduct produced by the company VEBA), 0.3 weight parts of Modaflow (being polyacrylate current means produced by the company MONSANTO), 77.0 weight parts of zinc powder 620, superfine (product of the company Zincoli, Aachen)

5.0 weight parts of aluminum powder.

Phase II: The pulverulent varnish according to the Example 2.

Both these powder varnishes are mixed together in the relation varying from 1:2 to 2:1. The phase II can be additionally colored according to the Example 3, or the granulate or powder is prepared according to the Example 5.

The drawing shows in a diagrammatical view the cross-section through a selectively layer-coated metallic substrate.

The metallic substrate marked by the numeral 1 is provided with a coating 2 selectively absorbing the sun heat energy, said coating including an inferior brightening layer 2a and a top layer 2b which absorbs the sun energy.

The metallic substrate may be pre-coated with the novel coating which may be differently colored after application.

I claim:

1. A process for production of a sun heat energy absorbing coating on a metallic substrate, said process comprising pretreating said metallic substrate for subsequent coating with a film of powder varnish; and depositing a coating of powder varnish based on solid synthetic resin electrostatically or in a whirl sintering procedure, said coating consisting of an inner brightening layer containing a metallic powder, and an outer colored second layer absorbing the sun energy.

2. The process of claim 1, wherein said metallic powder is aluminum powder.

3. The process of claim 1, wherein the powder varnish utilized for forming said sun energy absorbing layer is initially colorless and is colored before being deposited on said brightening layer.

4. The process of claim 1, wherein the powder varnish utilized for forming said sun energy absorbing layer is initially colorless and is transparently dyed after having been deposited on said brightening layer.

5. The process of claim 1, wherein said powder varnish is based on polyester resins.

6. The process of claim 1, wherein said sun energy absorbing layer is deposited in a thickness of between 30 and 100 microns.

7. The process of claim 1, wherein said coating consists of a phase dividing powder varnish comprising two phases, the phase forming said brightening layer containing aluminum powder.

8. The process of claim 7, wherein the phase forming said sun energy absorbing layer is colorless.

9. The process of claim 7, wherein the phase forming said sun energy absorbing layer has been colored before the deposition of said coating.

10. The process of claim 1, wherein said brightening layer contains an additional metallic powder.

11. The process of claim 10, wherein said additional metallic powder is powdered zinc.

12. The process of claim 1, wherein said metallic substrate is formed from aluminum.

* * * * *